(12) United States Patent
Aronovich et al.

(10) Patent No.: US 9,063,887 B2
(45) Date of Patent: *Jun. 23, 2015

(54) RESTORING DISTRIBUTED SHARED MEMORY DATA CONSISTENCY WITHIN A RECOVERY PROCESS FROM A CLUSTER NODE FAILURE

(71) Applicant: INTERNATIONAL BUSINESS MACHINES CORPORATION, Armonk, NY (US)

(72) Inventors: Lior Aronovich, Toronto (CA); Asaf Levy, Rishon Le Zion (IL); Liran Loya, Hod-Hasharon (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 216 days.

This patent is subject to a terminal disclaimer.

(21) Appl. No.: 13/801,797

(22) Filed: Mar. 13, 2013

(65) Prior Publication Data

US 2013/0232379 A1  Sep. 5, 2013

Related U.S. Application Data

(63) Continuation of application No. 12/950,869, filed on Nov. 19, 2010, now Pat. No. 8,819,056.

(51) Int. Cl.
*G06F 17/30* (2006.01)
*G06F 7/00* (2006.01)
(Continued)

(52) U.S. Cl.
CPC .......... *G06F 11/1412* (2013.01); *G06F 9/3863* (2013.01); *G06F 3/121* (2013.01);
(Continued)

(58) Field of Classification Search
CPC .... G06F 3/121; G06F 9/3863; G06F 11/1471
USPC ............. 707/769, 770, 999.01, 999.102; 709/213, 226, 205
See application file for complete search history.

(56) References Cited

U.S. PATENT DOCUMENTS

| | | |
|---|---|---|
| 5,623,659 A | 4/1997 | Shi et al. |
| 5,649,102 A | 7/1997 | Yamauchi et al. |

(Continued)

FOREIGN PATENT DOCUMENTS

| | | |
|---|---|---|
| EP | 0820016 A2 | 1/1998 |
| WO | WO2009062071 A1 | 5/2009 |

OTHER PUBLICATIONS

Dhruv S. Mehta, Makarand P. Sonare, Kamlesh D. Laddhad, Sameer S. Masram and Vijay S. Iyer, "Study and implementation of Distributed Shared Memory" Department of Electronics and Computer Science & Engineering, Visvesvaraya National Institute of Technology, Nagpur, 2004-2005.

(Continued)

*Primary Examiner* — Dung K Chau
(74) *Attorney, Agent, or Firm* — Griffiths & Seaton PLLC

(57) ABSTRACT

A set of data structures are stored in a distributed shared memory (DSM) component and in persistent storage. The DSM component is organized as a matrix of page. The data structure of the set of data structures occupies a column in the matrix of pages. A recovery file is maintained in the persistent storage. The recovery file consists of entries and each one of the entries corresponds to a column in the matrix of pages by a location of each one of the entries.

21 Claims, 9 Drawing Sheets

(51) Int. Cl.
*G06F 11/14* (2006.01)
*G06F 11/20* (2006.01)
*G06F 12/08* (2006.01)
G06F 9/38 (2006.01)
G06F 3/12 (2006.01)

(52) U.S. Cl.
CPC ...... *G06F11/1471* (2013.01); *G06F 17/30312* (2013.01); *G06F 17/30076* (2013.01); *G06F 11/1435* (2013.01); *G06F 11/2043* (2013.01); *G06F 12/0813* (2013.01)

(56) References Cited

U.S. PATENT DOCUMENTS

| | | | |
|---|---|---|---|
| 5,918,229 | A | 6/1999 | Davis et al. |
| 6,298,419 | B1 | 10/2001 | Kontothanassis et al. |
| 7,366,868 | B2 | 4/2008 | Reuter et al. |
| 7,720,928 | B2 | 5/2010 | Reuter et al. |
| 7,890,469 | B1 * | 2/2011 | Maionchi et al. ............ 707/654 |
| 8,473,531 | B2 * | 6/2013 | Wade et al. .................. 707/827 |
| 2002/0013889 | A1 | 1/2002 | Schuster et al. |
| 2002/0023270 | A1 * | 2/2002 | Thomas et al. ................ 725/95 |
| 2002/0129124 | A1 * | 9/2002 | Van Loo ...................... 709/219 |
| 2003/0105819 | A1 | 6/2003 | Kim et al. |
| 2005/0171970 | A1 | 8/2005 | Ozzie et al. |
| 2006/0277180 | A1 | 12/2006 | Okamoto |
| 2008/0256090 | A1 | 10/2008 | Dietterich et al. |
| 2009/0037585 | A1 | 2/2009 | Miloushev et al. |
| 2009/0292761 | A1 * | 11/2009 | Lemmers et al. ............. 709/203 |
| 2009/0320073 | A1 | 12/2009 | Reisman |
| 2010/0049718 | A1 * | 2/2010 | Aronovich et al. ............. 707/10 |
| 2010/0049921 | A1 | 2/2010 | Aronovich et al. |
| 2010/0257337 | A1 | 10/2010 | Pan et al. |
| 2011/0082996 | A1 | 4/2011 | Wester et al. |

OTHER PUBLICATIONS

Jelica Protic, Milo Tomasevic, and Vejko Milutinovic, "Distributed Shared Memory: Concepts and Systems", University of Belgrade, 1996.

David Hilley et al.,"Pesistent Temporal Streams,"ACM Digital Library, 2009, 20 pages.

Kaloian Manassiev et al., "Exploiting Distributed Version Concurrency in a Transactional Memory Cluster," ACM 1-59593-189-9/06-0003, 2006, pp. 198-208.

Marc Shapiro et al, "Larchant-RDOSS: a Distributed Shared Persistent Memory and its Garbage Collector," WDAG'95, 9th International Workshop on Distributed Algorithms, Le Mont Saint Michel (France), Sep. 1995, 15 pages.

Chunqiang Tang, "Data Sharing and Information Retrieval in Wide-Area Distributed Systems," Department of Computer Science, The College Arts and Sciences, University of Rochester, Rochester, New York, 2004, 357 pages.

Karthikeyan Vaidyanathan et al., "DDSS: A Low-Overhead Distributed Data Sharing Substrate for Cluster-Based Data-Centers over Modern Interconnects," Department of Computer Science and Engineering, The Ohio State University, 2006, 12 pages.

* cited by examiner

RESTORING DISTRIBUTED SHARED MEMORY DATA CONSISTENCY WITHIN A RECOVERY PROCESS FROM A CLUSTER NODE FAILURE

CROSS-REFERENCE TO RELATED APPLICATIONS

This application is a Continuation of U.S. patent application Ser. No. 12/950,869, filed on Nov. 19, 2010.

FIELD OF THE INVENTION

The present invention relates in general to computers, and more particularly to apparatus, method and computer program product embodiments for restoring distributed shared memory (DSM) data consistency within a recovery process from a failure of a node in a cluster of nodes in a computing environment.

DESCRIPTION OF THE RELATED ART

Distributed shared memory (DSM) provides an abstraction that allows users to view a physically distributed memory of a distributed system as a virtually shared address space. A central advantage of DSM is the convenience provided for the programmers of distributed applications, reducing or eliminating the requirement to be aware of the distributed architecture of the system and the requirement to use a less intuitive form of communication within a distributed system via message passing. Another advantage of DSM is the ability to directly port software written for non-distributed systems to work on distributed systems.

There are many forms of DSM algorithms, all of them sharing a fundamental architecture of being composed of distributed agents deployed on the clustered nodes (i.e. processors), each agent maintaining local data structures and memory data segments, and a communication protocol over a message passing layer being used to coordinate operations among the agents. A central goal of any DSM algorithm is to minimize message traffic for a given workload. An underlying goal is to maintain memory coherency of each agent and of the entire DSM.

SUMMARY OF THE INVENTION

In an application based on DSM, where data entities residing on DSM memory pages may be accessed intensively and interchangeably for writing and reading by multiple users across a DSM cluster, the DSM algorithms of the class described above, although optimized in themselves, may entail an intense messaging traffic, as pages are frequently invalidated to provide exclusive access and then shared again among respective cluster nodes.

Furthermore, such a usage pattern may make the process of failover more challenging and more costly in terms of the required processing time and messaging traffic. Failover is the process where one or more of the nodes in the cluster fail and eventually removed from the cluster, and the remaining nodes recover their internal and mutual consistency, such that normal operation is enabled after completion of the failover process. One challenge that may arise with the usage pattern described above is that the latest contents of the set of DSM pages for which the failed node was the last node to update their contents, may be lost and should be recovered using some application specific method or logic. In view of the foregoing, a need exists for mechanisms facilitating reduction of DSM messaging traffic, and facilitating the process of recovery performed by remaining nodes during a failover operation.

Accordingly, various embodiments for facilitating search, list and retrieval operations on a persistent data set using a distributed shared memory (DSM) by a processor device are provided. In one embodiment, various aspects of the present invention are operable in the following application. In this application, a set of data structures is stored on persistent storage, which is shared among and accessible to a cluster of processors (i.e. nodes). It is assumed that the data set fits in the memory of each of the cluster nodes, but the data set is required to be persistent. There is an order relation among these data structures, and each data structure is associated with a set of properties constituting a key for identification and search. The key is constant once the data structure has been created. Most frequent operations on the data set include search, list and retrieval of data structures. Less frequent operations include update of the contents/properties of individual data structures, and least frequent operations include addition and removal of data structures to/from the set. Each of these operations is applied concurrently to the data set.

In such an exemplary application, the mechanisms of the present invention aim, in one embodiment, to optimize and accelerate the processing of the frequent operations, primarily the search, list and retrieval operations. In these mechanisms, for example, a DSM is used to store the data structures in a cluster shared memory, such that updates, deletions and insertions (which are infrequent) are applied to both the persistent storage and the DSM, and search, list and retrieval operations (which are frequent) are processed directly from the DSM, thus saving accesses to persistent storage and accelerating processing.

In an exemplary embodiment, a data structure in a persistent data set is stored in two separate DSM pages: a first page includes an identifying search key of the data structure, the search key also pointing to a location of the data structure in the storage. A second page includes the updateable properties of the data structure. A DSM storing the data structures' pages is organized as a two row matrix, wherein one row stores the data structures' keys pages, and the second row stores the data structures' updateable properties pages, and each occupied column in the matrix corresponds to a specific data structure in the persistent storage. A synchronization page is defined for the DSM matrix, facilitating synchronization between operations that modify the assignment of columns to data structures, and operations that do not modify the assignment. Insertion operations take an exclusive permission on the synchronization page for the duration of the operation, while all other types of operations take a shared permission on the synchronization page for the duration of the operation. To facilitate failover processing, a DSM recovery file is maintained in the persistent storage, where the file reflects the structure of the DSM matrix. The file is updated during insertion operations, and is used during failover processing to locate the persistent data structures to be loaded into invalid DSM pages.

In an exemplary embodiment, a set of data structures are stored in a distributed shared memory (DSM) component and in persistent storage. The DSM component is organized as a matrix of page. The data structure of the set of data structures occupies a column in the matrix of pages. A recovery file is maintained in the persistent storage. The recovery file consists of entries and each one of the entries corresponds to a column in the matrix of pages by a location of each one of the entries.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
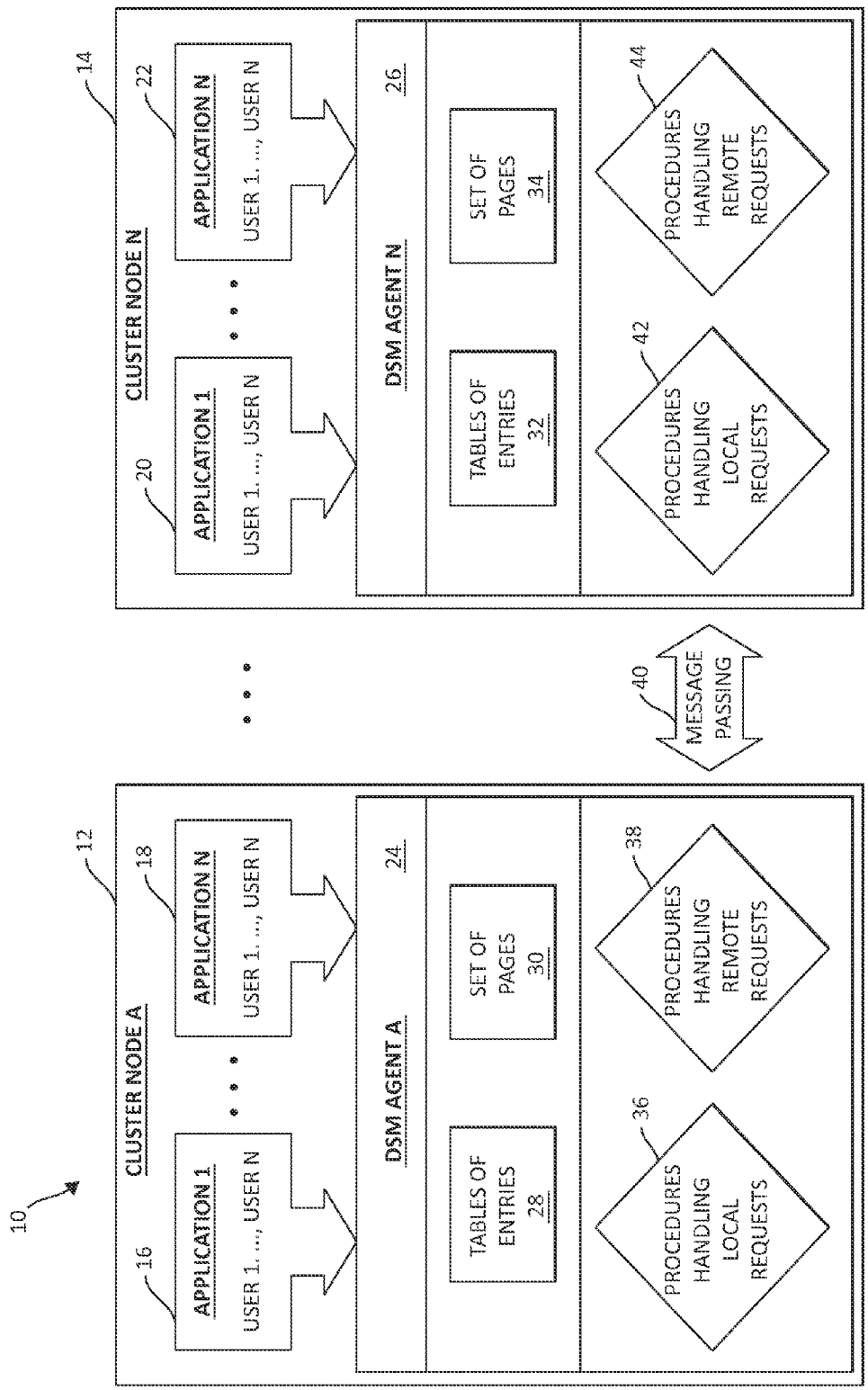
FIG. 1 illustrates an exemplary distributed shared memory (DSM) architecture in which aspects of the present invention may be implemented.

As previously mentioned, distributed shared memory (DSM) provides an abstraction that allows users to view a physically distributed memory of a distributed system as a virtually shared address space. The entire memory space of a DSM instance is partitioned into pages of arbitrary and possibly different sizes. A DSM agent resides on each of the clustered nodes. Each DSM agent manages a local set of memory pages, corresponding to the cluster-wide DSM memory space, and an associated table of entries. Each page is associated with an entry in that table.

A user may obtain permission to access a specific page, via the DSM agent servicing its node, atomically with respect to all other users on all nodes sharing the DSM instance. The permission may be shared, namely the data segment may be only read. This permission can be obtained concurrently by multiple users. Alternatively the permission may be exclusive, namely the data segment may be also modified. This permission is mutually exclusive with all other users. A valid permission generally refers to having either shared or exclusive permission. When granting permission, the latest contents of the page is also made available to the user (the local agent may obtain it from another agent over the network). The latest permission obtained for each page is recorded by each agent within its table of entries. Permissions are modified only due to user requests.

Each page has a single owner in the DSM instance, which is one of the DSM agents. The owner's identify (or approximate identify) for each page is recorded by each agent within the local entry associated with that page. The ownership of a page may be dynamically changed during processing of user requests, and different entries may have different owners. Generally, when a user request entails an upgrade of permission for a specific page, a request must be issued to the owner of that page. If the owner is not the local agent then the request is issued over the message passing layer to the remote owning agent. The owner of a page serializes processing of requests issued concurrently for that page, and has complete knowledge of the whereabouts of the latest contents of that page. Ownership of a page may be exchanged between the agents, triggered by processing of user requests, in the following cases: (1) when a user is given exclusive permission on a page, the DSM agent servicing its node is set as the owner of that page, and (2) when a user is given shared permission on a page and the remote owner does not have any permission on that page, the DSM agent servicing the node of the requesting user is set as the owner of that page.

Generally, when a user requests permission on a page, which entails upgrading the current permission held by the local DSM agent on the relevant page (upgrading means switching from no permission to shared or exclusive permission, or switching from shared permission to exclusive permission), a message is generated and sent by the DSM agent servicing the cluster node where the requesting user is operating. There are generally two types of messages: (1) a permission request: sent from a non owning agent to the agent owning the page, in order for the owning agent to process and grant the upgraded permission on that page, and (2) an invalidation request: sent from an agent owning a page to another agent, in a case where the owning agent requires to upgrade its permission from shared to exclusive, and the other agent may hold a shared permission and a valid copy of that page. There may be multiple non owning agents complying with this condition, and in such a case an invalidation message is sent to each such agent.

A DSM algorithm defines procedures to be performed by the DSM agents upon receiving an event. There are procedures for processing requests issued by local users. These procedures may generate and send request messages to remote agents, in accordance with the cases in the previous paragraph. There are also procedures for processing requests encoded in messages arriving from remote agents over the message passing layer. These procedures may generate and send response messages to the remote agents.

All of these procedures include a first step that checks for conditions that require the procedure to block until these conditions are cleared. These conditions apply for the specific entry and page for which a request is being processed by the procedure. One condition for blocking is mutual exclusion, namely enforcing a policy of multiple readers and a single writer. An additional condition is blocking as long as there is an ongoing messaging session (i.e. a request followed by a response) initiated by the local agent with regards to the specific entry and page which are being processed. After this first step, a procedure proceeds to process the request, which may or may not include generating and sending a message to one or more remote agents.

FIG. 1 illustrates exemplary DSM architecture 10 in which aspects of the present invention may be implemented. Two exemplary cluster nodes, A and N (denoted by reference numbers 12, and 14) are represented, in which messages 40 are passed between. Turning first to cluster node 12, a number of applications 16, 18 are associated with a number of users (e.g., representative of 1 to n users) as shown. The number of users are representative of threads of execution within the applications 16, 18, where the threads of execution perform logic that uses a DSM instance. A DSM agent 24 servicing the cluster node 12 is responsible for a table of entries 28 and a set of pages 30. For the DSM agent 24, a number of procedures for handling local and remote requests 36 and 38 are associated, where the number of procedures operate on the table of entries 28 and the set of pages 30. Similarly, in cluster node 14, a number of applications 20 and 22 are associated with a number of users (again, representative of 1 to n users). DSM agent 26 servicing the cluster node 14 is responsible for a table of entries 32 and a set of pages 34. As similarly described for DSM agent 24, for the DSM agent 26, a number of procedures for handling local and remote requests 42 and 44 are associated, where the number of procedures operate on the table of entries 32 and the set of pages 34. A specific example of a DSM algorithm of the class described above is specified in U.S. Patent Application Publication 2010/0049922, entitled "Distributed Shared Memory", and assigned to International Business Machines Corporation (IBM), the relevant portions therein incorporated by reference.

Again, and as previously described, in an application based on DSM, where data entities residing on DSM pages may be accessed intensively and interchangeably for writing and reading by multiple users across the cluster, the DSM algorithms of the class described above, although optimized in themselves, may entail an intense messaging traffic, as pages are frequently invalidated to provide exclusive access and then shared again among the nodes. Furthermore, such a usage pattern may make the process of failover more challenging and more costly in terms of the required processing time and messaging traffic.

In one embodiment, various aspects of the present invention are operable in the following application. In this application, a set of data structures is stored on persistent storage, which is shared among and accessible to a cluster of processors (i.e. nodes). It is assumed that the data set fits in the memory of each of the cluster nodes, but the data set has to be persistent. There is an order relation among these data structures, and each data structure is associated with a set of properties constituting a key for identification and search. The key is constant once the data structure has been created. Most frequent operations on the data set include search, list and retrieval of data structures. Less frequent operations include update of the contents/properties of individual data structures, and least frequent operations include addition and removal of data structures to/from the set. Each of these operations is applied concurrently to the data set.

In such an exemplary application, the mechanisms of the present invention aim, in one embodiment, to optimize and accelerate the processing of the frequent operations, primarily the search, list and retrieval operations. In these mechanisms, for example, a DSM is used to store the data structures in a cluster shared memory, such that updates, deletions and insertions (which are infrequent) are applied to both the persistent storage and the DSM, and search, list and retrieval operations (which are frequent) are processed directly from the DSM, thus saving accesses to persistent storage and accelerating processing.

In addition to the foregoing, additional mechanisms of the present invention enable to achieve the following properties. First, efficient concurrency of operations applied to the data set; second, minimized internal messaging traffic between the distributed agents of the DSM mechanism; and finally, efficient failover processing.

The basic DSM algorithm, whose main elements are described previously, optimizes and minimizes the internal communication between the DSM agents residing on the cluster nodes, based on a general usage pattern of a DSM application. The illustrated embodiments enable to further reduce the internal communication between the DSM agents, by means of architecting the DSM based application and the data structures it maintains over DSM pages in a specific way. The mechanisms of the illustrated embodiments support efficient concurrency of operations applied to the data set, namely search, list, retrieval, update, insertion and deletion operations, while minimizing internal DSM communication as will be further detailed. Furthermore, the mechanisms of the illustrated embodiments support efficient failover processing.

In one aspect of the illustrated embodiments, each data structure in the persistent set is stored in two separate pages in the DSM. One page contains the properties constituting the identification and search key of the data structure, and the second page contains the updatable properties of the data structure. The key also points to the location of the data structure in the storage. The DSM is organized basically as a two-row matrix. One row stores the data structures' keys, and the second row stores the data structures' updateable properties, such that each occupied column (i.e. one key page and one updateable properties page) in the matrix corresponds to a specific data structure in the persistent set. The data structures are stored in the DSM matrix in a sorted order based on their keys. This allows to locate specific data structures efficiently using binary search, and to efficiently process list operations, which are normally based also on the keys order. The size of the DSM matrix is defined such that it enables to accommodate the maximal number of data structures supported in the persistent set. Assignment of a two-page column in the DSM matrix to a specific data structure may change over time, depending on the operations applied to the data set (e.g. insertion and deletion of data structures).

In another aspect of the illustrated embodiments, a synchronization page is defined for the DSM matrix, facilitating synchronization between operations that modify the assignment of columns to data structures, and operations that do not modify the assignment. Essentially, the only type of operations that modify this assignment is insertion of data structures. Thus insertion operations take an exclusive permission on the synchronization page for the duration of the operation, while all other types of operations take a shared permission on the synchronization page for the duration of the operation. The synchronization page may contain additional information (depending on the specific implementation), such as a version number of the DSM matrix.

As previously mentioned, the mechanisms of the present invention support efficient failover processing. A challenge in processing failover in this setting is the case where a node in the cluster performs changes in the assignment of DSM columns to persistent data structures, and then fails before other nodes access these pages, thus the contents of these pages and their assignment information are lost in the perspective of the other nodes during failover. Specifically, in this case, at the time of failover processing, a subset of the key pages are invalidated in the local DSMs of all remaining cluster nodes (as these pages were last updated by the node that failed), and thus there is no information on which data structures should be loaded into these pages, and where to locate these structures in the storage. To solve this challenge, the mechanisms of the illustrated embodiments define a DSM recovery file in the persistent storage, which reflects the structure of the DSM matrix. Specifically, each entry in the file corresponds by its location to a specific column in the DSM matrix, and indicates whether or not the associated column in the DSM matrix is assigned with a persistent data structure, and if assigned it indicates the specific location of that data structure in the persistent storage. The recovery file is updated during insertion operations (which change columns' assignments), and is used during failover processing to locate the persistent data structures to be loaded into invalid DSM pages.

The benefits of the illustrated embodiments, following, include increased efficiency of operations that are based solely on the key portions of the DSM based data structures, namely search, list and retrieval operations, whose processing essentially requires no internal DSM communication. In addition, the DSM matrix exemplified in the illustrated embodiments efficiently supports concurrent operations, namely search, list, retrieval, update of data structures, insertion and deletion of data structures, such that internal DSM communication is minimized. And finally, as previously mentioned, the illustrated embodiments efficiently implement failover processing.

Figure 2:
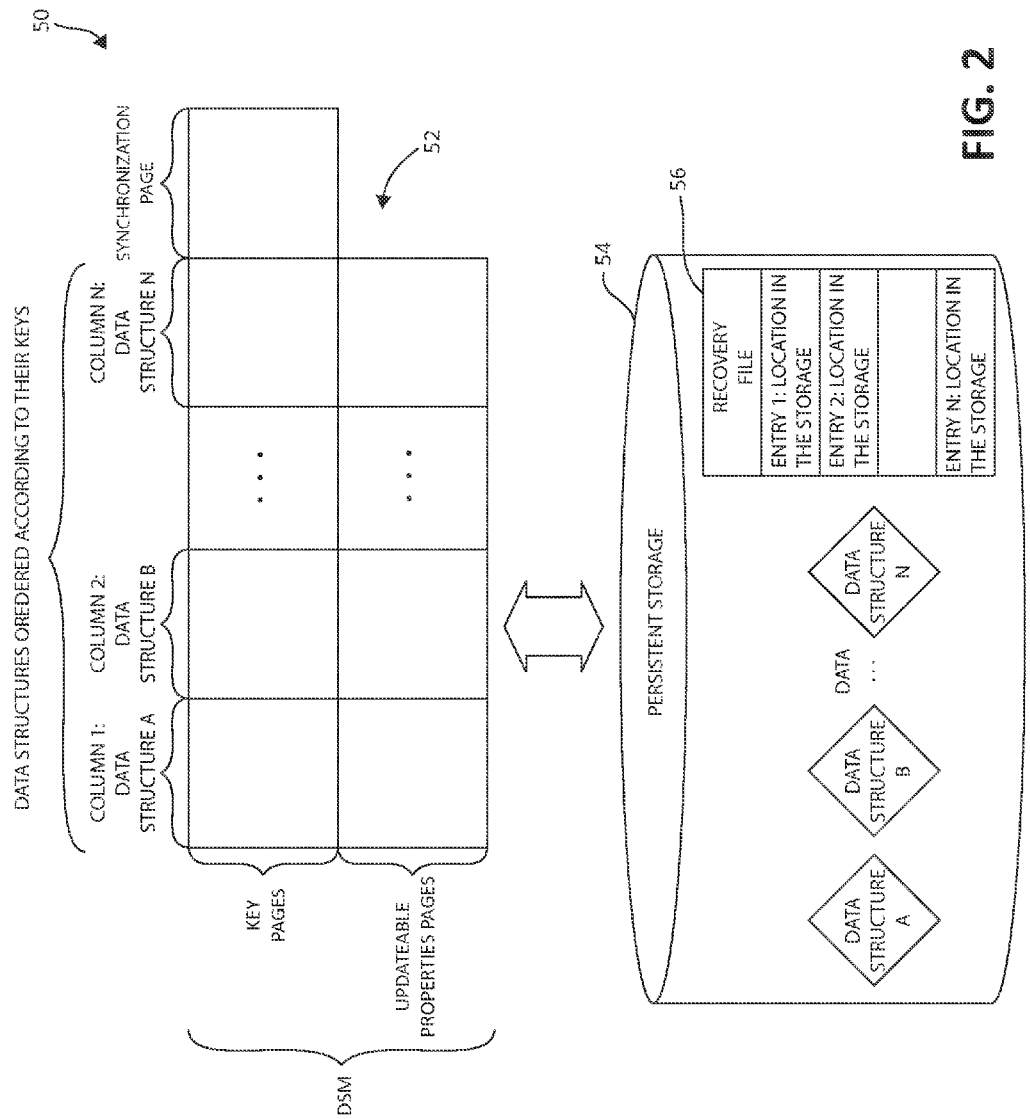
FIG. 2 illustrates exemplary architecture for organizing data structures in a distributed shared memory matrix, in which various aspects of the present invention may be implemented.

Turning now to FIG. 2, exemplary architecture 50 illustrating a DSM containing a number of data structures (A to N) in columns is shown. The architecture 50, and the various data structures are organized in the DSM by key pages and by updatable properties pages in a two-row matrix 52 as shown, and as described previously. A synchronization page, defined in the DSM and associated with the DSM matrix, assists in facilitating synchronization between operations that modify the assignment of columns to data structures, and operations that do not modify the assignment as previously described. The DSM architecture 50 is operable in conjunction with persistent storage 54, which houses the data structures A-N as shown, and also includes a recovery file 56 having 1 to N entries showing the locations of the data structures A-N in the persistent storage 54.

FIGS. 3-7, following, illustrate exemplary methods for processing various operations such as a search, modification, insertion, deletion and failover operation as previously described. As one skilled in the art will appreciate, various steps in the methods shown in the following figures may be implemented in differing ways to suit a particular application. In addition, the described method may be implemented by various means, such as hardware, software, firmware, or a combination thereof operational on or otherwise associated with the computing environment. For example, the methods presented, following, may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Figure 3:
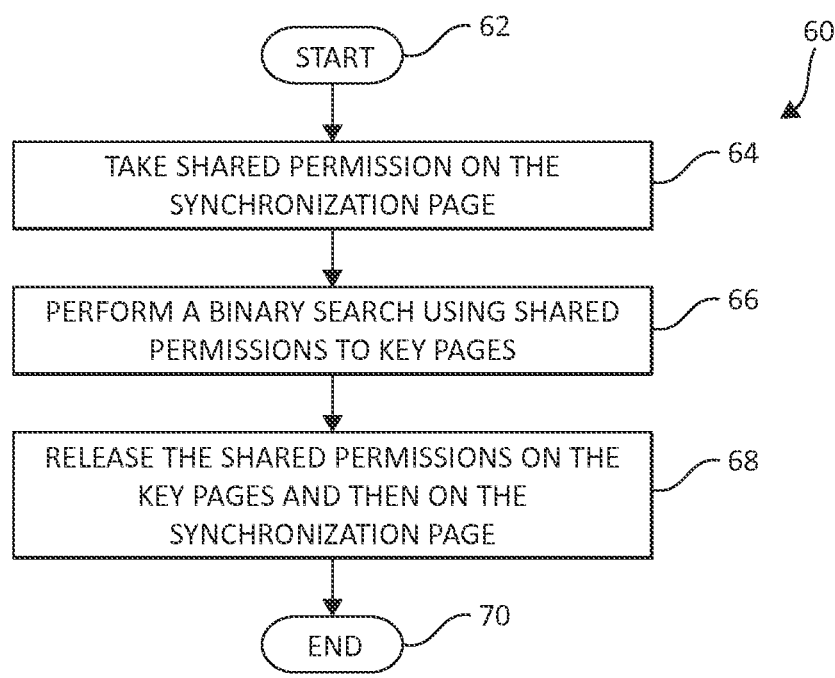
FIG. 3 illustrates an exemplary method for performing a search procedure for a data structure according to various aspects of the present invention.

Turning first to FIG. 3, an exemplary method 60 for performing a search procedure for a data structure in an architecture such as architecture 50 (FIG. 2) is depicted. Method 60 begins (step 62), by a shared permission taken on the synchronization page for the duration of the operation (step 64). A binary search is performed using shared permissions to key pages (step 66). Page permissions are not nested. As a next step, at the end of the search operation, the shared permissions on the key pages, and then on the synchronization page, are released (step 68). The method 60 then ends (step 70).

Figure 4:
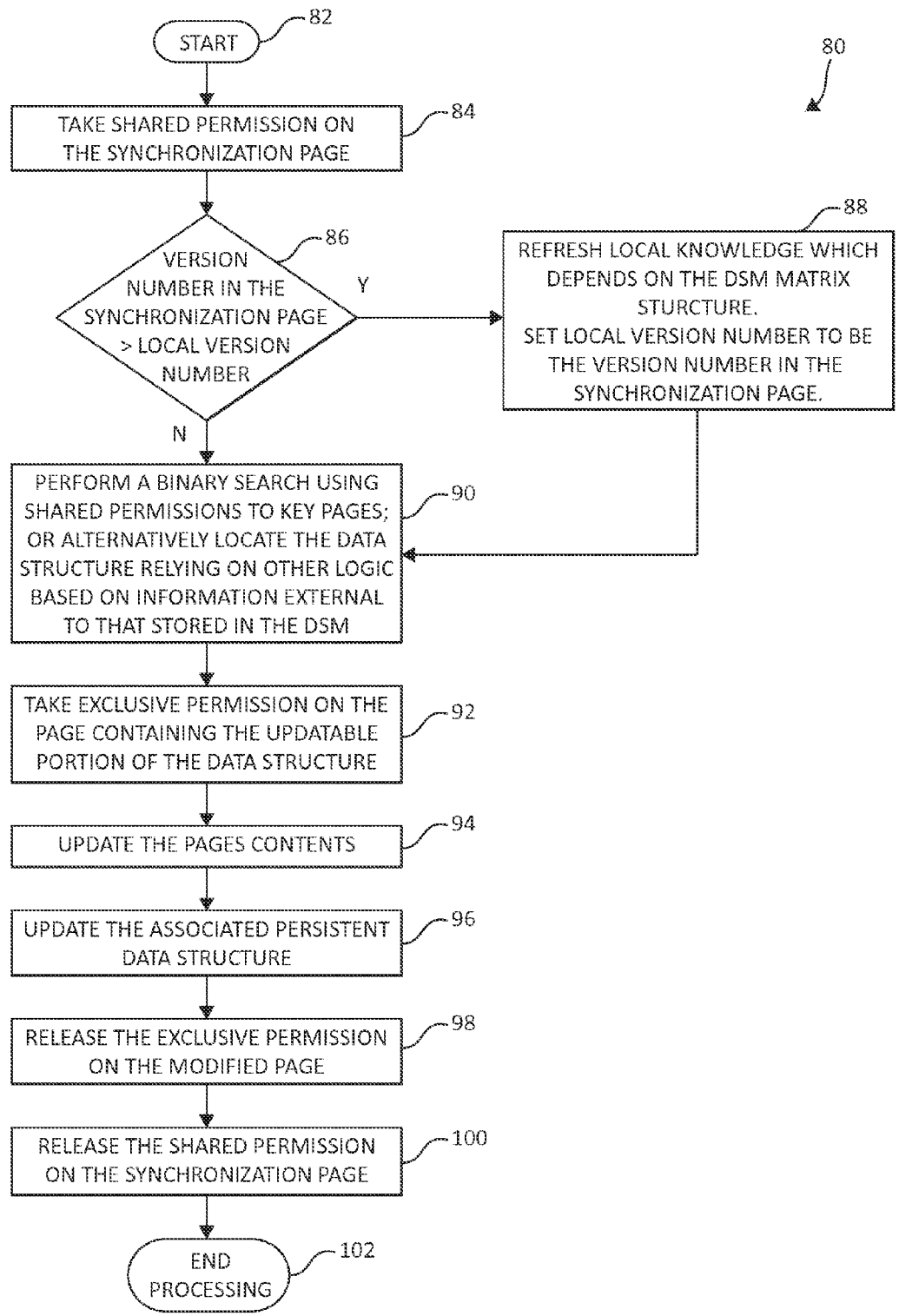
FIG. 4 illustrates an exemplary method for performing a modification procedure of a data structure according to various aspects of the present invention

FIG. 4 shows an exemplary method 80 for performing a modification procedure of a data structure in an architecture such as architecture 50 (again, FIG. 2). The modification is applied to the updatable portion of the data structure, and the operation does not modify the structure of the DSM matrix. Method 80 begins (step 82) with a shared permission taken on the synchronization page for the duration of the operation (step 84). If the following processing of the operation depends in any way on the knowledge whether a structural modification has occurred since a last access to the DSM matrix (for example if processing relies on some local information which depends on the structure of the DSM matrix), then the version number in the synchronization page is compared to a local version number, and if the local version number is smaller than that in the synchronization page (step 86), then logic is activated to refresh the local knowledge (such logic is generally based on read-only accesses to some subset of the DSM matrix) (step 88). The local version number is then set to be the version number in the synchronization page.

The requested data structure is located using a binary search on the key pages, or alternatively relying on other logic based on information external to that stored in the DSM (step 90). This is done using shared permissions on the DSM key pages. An exclusive permission is taken on the page containing the updatable portion of the data structure to be modified (step 92). Page permissions are not nested. The page's content is modified (step 94). The associated persistent data structure is modified (step 96). The exclusive permission on the modified page is released (step 98). The shared permission on the synchronization page is released (step 100). The method 80 then ends (step 102).

Figure 5:
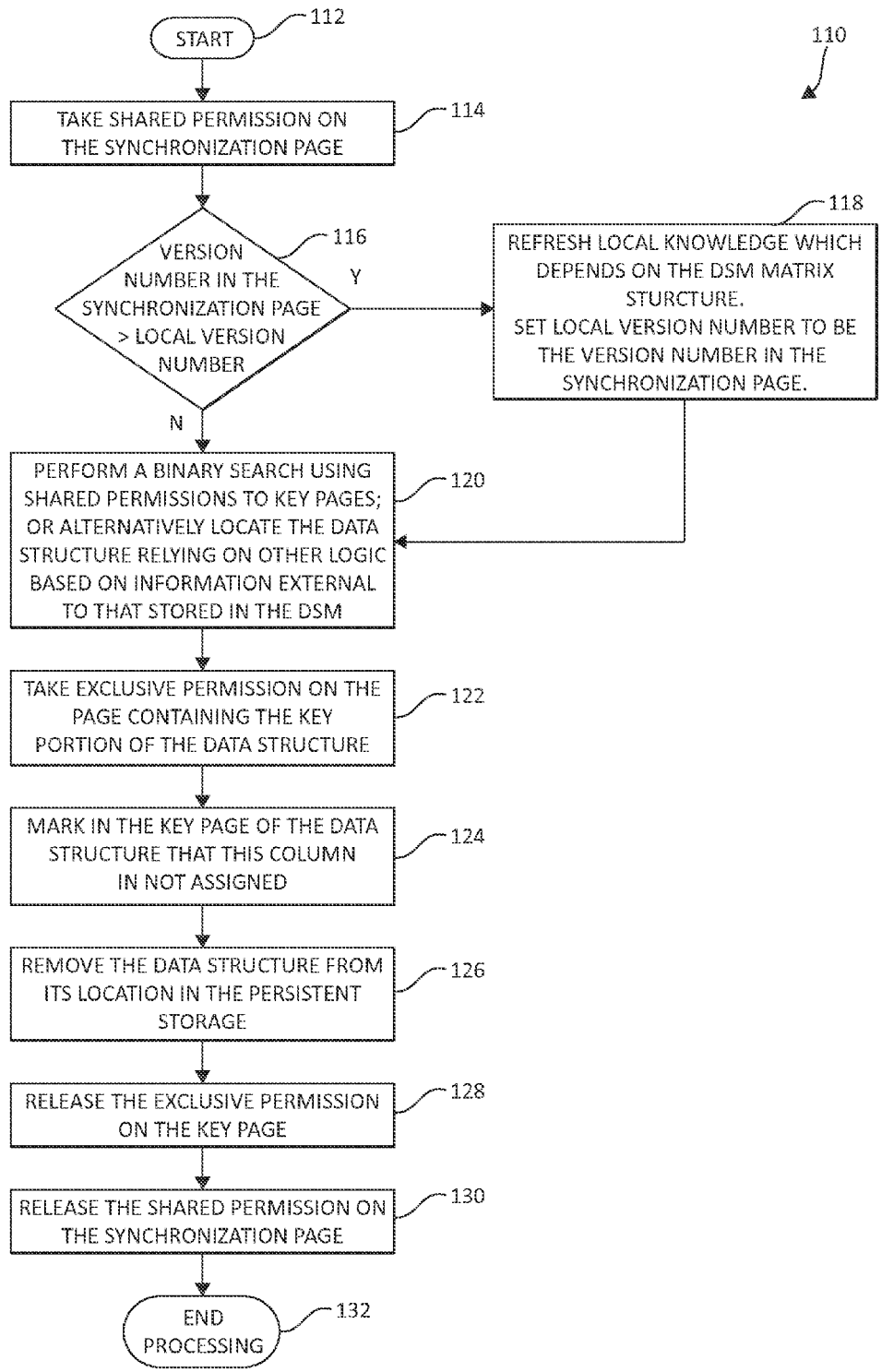
FIG. 5 illustrates an exemplary method for performing a deletion procedure of a data structure according to various aspects of the present invention.

FIG. 5, following, shows an exemplary method 110 for performing a deletion procedure of a data structure in an architecture such as architecture 50 (again, FIG. 2). Method 110 begins (step 112), by taking a shared permission on the synchronization page for the duration of the operation. If the following processing of the operation depends in any way on the knowledge whether a structural modification has occurred since a last access to the DSM matrix (for example if processing relies on some local information which depends on the structure of the DSM matrix), then the version number in the synchronization page is compared to a local version number, and if the local version number is smaller than that in the synchronization page (step 116), then logic is activated to refresh the local knowledge (such logic is generally based on read-only accesses to some subset of the DSM matrix) (step 118). The local version number is then set to be the version number in the synchronization page.

The data structure to be deleted is located using a binary search on the key pages, or alternatively relying on other logic based on information external to that stored in the DSM. This is done using shared permissions on the DSM key pages (step 120). An exclusive permission is taken on the page containing the key portion of the data structure to be deleted (step 122). Page permissions are not nested. The data structure is marked in its key page as not assigned (step 124). The data structure is removed from its location in the persistent storage (step 126). The exclusive permission on the key page is released (step 128). The shared permission on the synchronization page is released (step 130). The method 110 then ends (step 132).

It should be noted that since deletion is implemented by marking the data structure as deleted, and avoiding any structural modification of the DSM matrix (namely, other pages' assignments with data structures are not modified by this operation), the deletion can take shared permission on the synchronization page. All other operations, when accessing key pages, check if the key page is assigned to a data structure or not, and consider the column only if the key page is assigned. Also, it should be noted that the DSM recovery file is not accessed during the deletion operation. After the deletion operation the DSM recovery file still contains a reference to the data structure that has been deleted. However, since the data structure is deleted from the persistent storage this state is consistent, as will be shown in the exemplary method for processing failover, following.

Figure 6:
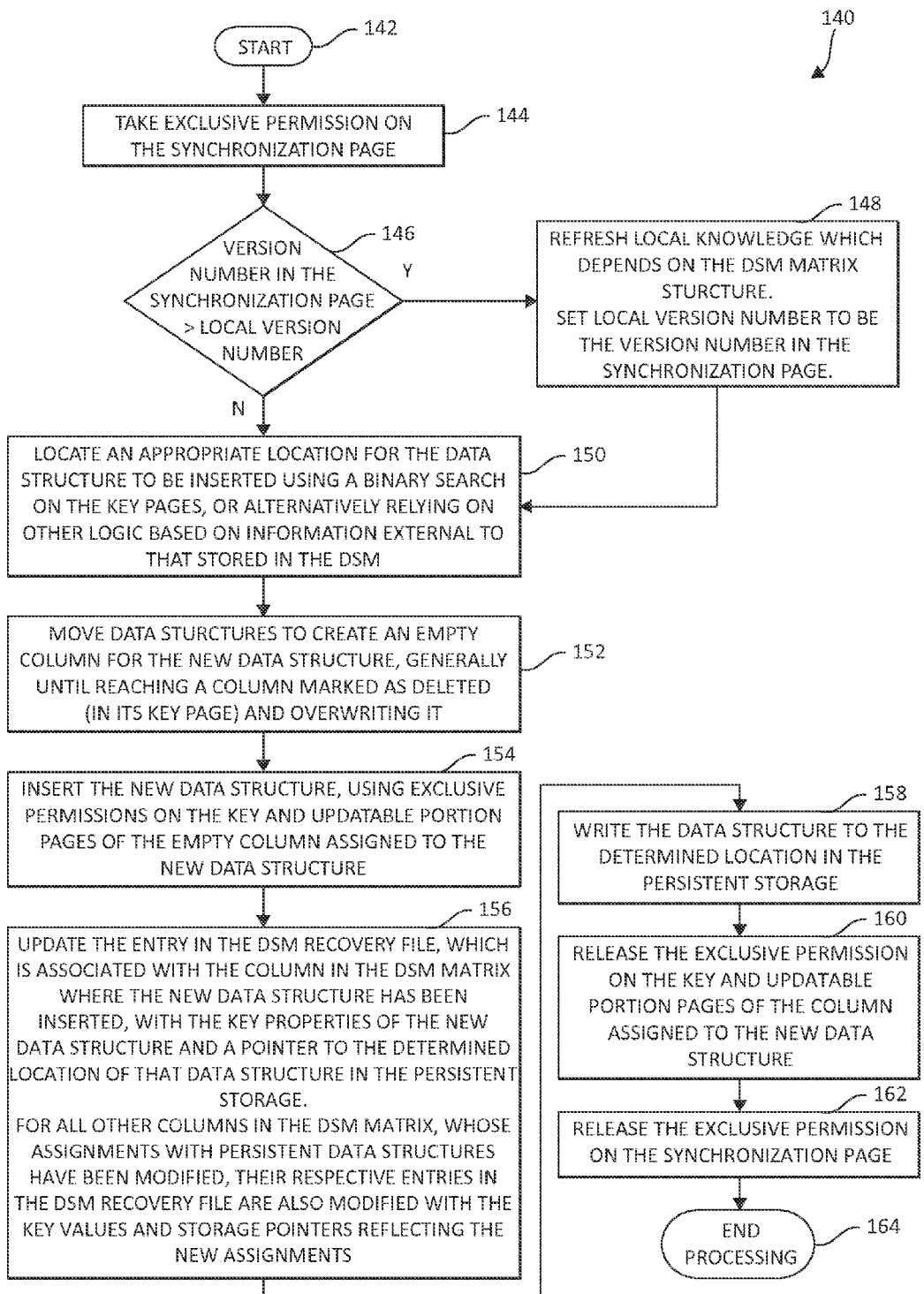
FIG. 6 illustrates an exemplary method for performing an insertion procedure of a data structure according to various aspects of the present invention.

FIG. 6, following, shows an exemplary method 140 for performing an insertion procedure of a data structure in an architecture such as architecture 50 (again, FIG. 2). Method 140 begins (step 142), by taking an exclusive permission on the synchronization page for the duration of the operation (step 144). If the following processing of the operation depends in any way on the knowledge whether a structural modification has occurred since a last access to the DSM matrix (for example if processing relies on some local information which depends on the structure of the DSM matrix), then the version number in the synchronization page is compared to a local version number, and if the local version number is smaller than that in the synchronization page (step 146), then logic is activated to refresh the local knowledge (such logic is generally based on read-only accesses to some subset of the DSM matrix) (step 148). The version number in the synchronization page is then incremented, and this incremented value is also set to be the local version number.

An appropriate location for the data structure to be inserted is located using a binary search on the key pages, or alternatively relying on other logic based on information external to that stored in the DSM (step 150). This is done using shared permissions on the DSM key pages. Data structures are moved to create an empty column for the new data structure, generally until reaching a column marked as deleted (in its key page) and overwriting it (step 152). This is done using exclusive permissions on key portion pages and updatable portion pages. The new data structure is inserted, using exclusive permissions on the key and updatable portion pages of the empty column assigned to the new data structure (step 154). Throughout this process page permissions are not nested.

The entry in the DSM recovery file, which is associated with the column in the DSM matrix where the new data structure has been inserted, is updated with the key properties of the new data structure and a pointer to the determined location of that data structure in the persistent storage. In addition, for all other columns in the DSM matrix, whose assignments with persistent data structures have been modified, their respective entries in the DSM recovery file are also modified with the key values and storage pointers reflecting the new assignments. Modification of the recovery file is done such that the updates are performed in memory and then these updates are flushed to the persistent file (step 156). The new data structure is now written to the determined location in the persistent storage (step 158). The exclusive permissions on the key and updatable portion pages of the column assigned to the new data structure are released (step 160). The exclusive permission on the synchronization page is released (step 162). The method 140 then ends (step 164).

Figure 7A:
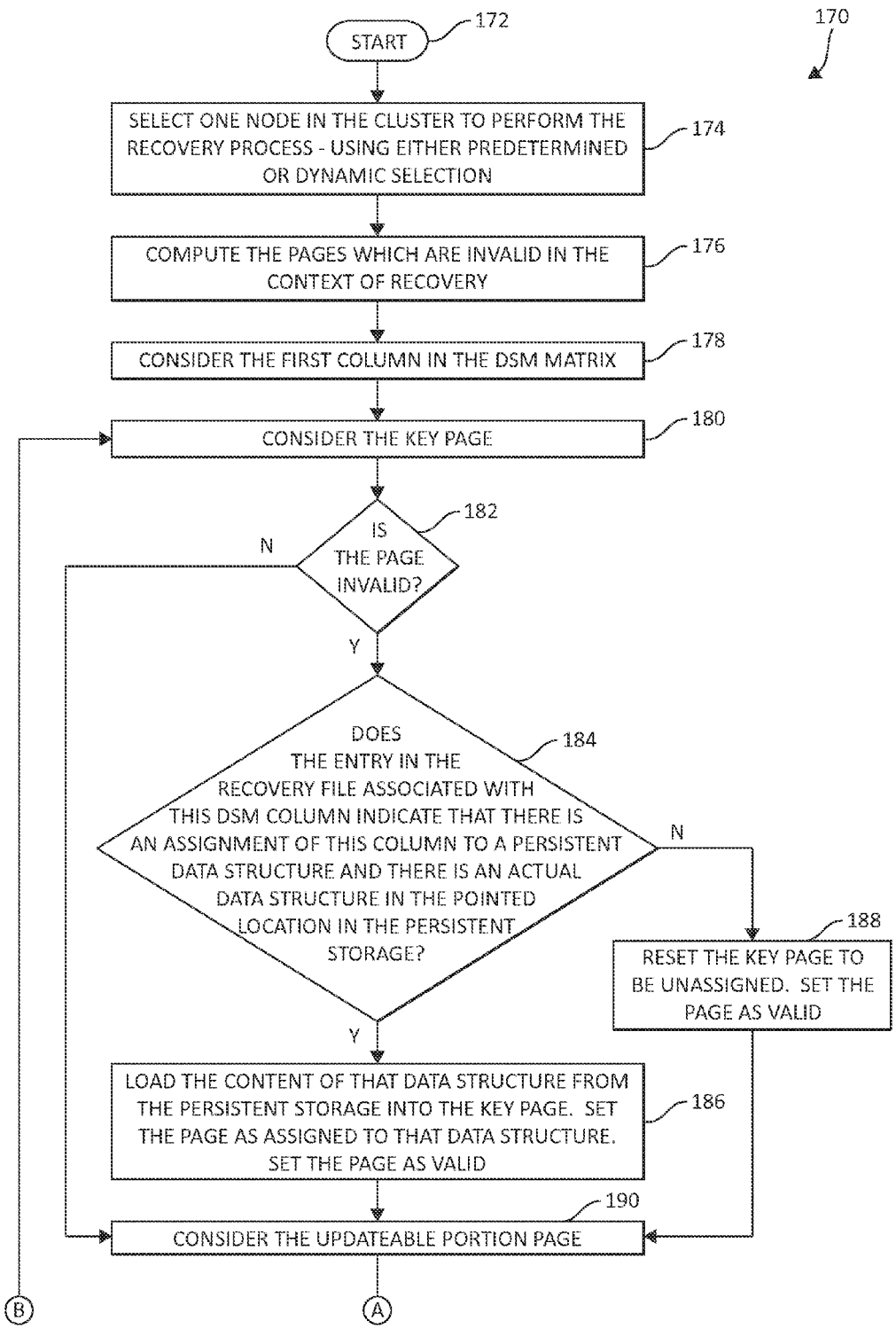
FIGS. 7A and 7B illustrate exemplary methods for performing a failover procedure according to various aspects of the present invention.
Figure 7B:
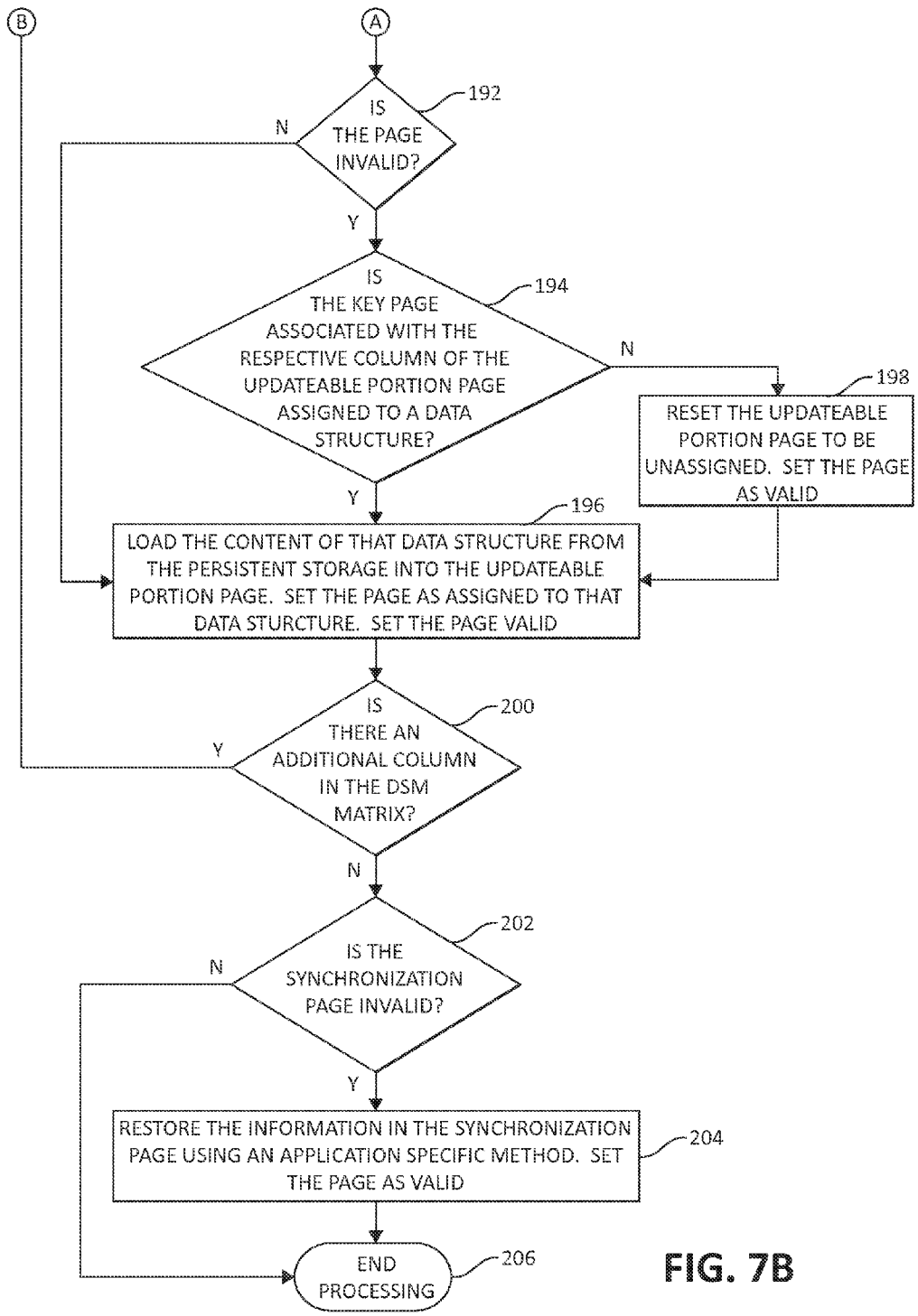

As previously mentioned, a failover event occurs when a node in the cluster fails. In failover processing, the DSM and the persistent data are recovered to reach consistency, and when this processing is complete the cluster is operational. Turning now to FIGS. 7A and 7B, an exemplary method 170 for processing a failover operation in architectures such as architecture 50 (again, FIG. 2) is shown. Method 170 begins, as a preliminary matter, by the selection of a node (step 174). One node in the cluster performs the recovery process. This node is either predetermined or selected at the beginning of failover processing.

In the recovery process, each page in the DSM is inspected, and a page specific recovery operation is required only for pages whose content is invalid in the context of recovery. An invalid page in the context of recovery is defined as a page that is invalid in the local DSMs of all the remaining cluster nodes (i.e. all the nodes except the node that failed). To compute the invalid pages (step 176), for each page which is invalid in the local DSM of the node performing the recovery, this node inquires with the other nodes regarding the validity of that page, and the page is declared as invalid in the context of recovery only if it is invalid in the DSMs of all the remaining cluster nodes. This process may be performed with consolidated messages (i.e. containing information on multiple invalid pages). For pages whose content is invalid in the context of recovery, in this exemplary embodiment, the DSM mechanism blocks all accesses to such pages for the duration of failover processing, for all regular threads of execution (i.e. threads which are not the thread performing the recovery). Therefore, the thread performing the recovery can access these pages, after ensuring that their content is invalid in the context of recovery, without obtaining permission for their access.

The failover procedure iterates on the columns of the DSM matrix (e.g., step 178), and for each column (step 200) it first inspects the key page (step 180) and then the updateable portion page (step 190). If the current page is a key page (again, step 180), and the page is invalid (step 182), then its associated entry in the recovery file is inspected and the following is applied. If the entry indicates that there is no assignment of this column in the DSM matrix to a data structure in the persistent storage, or if the entry does indicate that there is such an assignment but there is no actual data structure in the pointed location in the persistent storage (step 184), then that key page is reset to be unassigned, and the key page is also set as valid (steps 188). It is noted that since the recovery file is not updated during deletion of data structures, there may be cases where an entry in the recovery file indicates assignment to a persistent data structure, but that data structure does not exist in the pointed location in the persistent storage.

If the entry indicates that there is an assignment of this column in the DSM matrix to a data structure in the persistent storage, and there is an actual data structure in the pointed location in the persistent storage (again, step 184), then the content of that data structure is loaded from the persistent storage into the key page, and the key page is set as assigned to that data structure. The key page is set as valid (step 186).

If the current page is an updateable portion page (step 190), and the page is invalid (step 192), then the following is applied. If the key page associated with the respective column of that updateable portion page is unassigned to a data structure (step 194), then the updateable portion page is also reset to be unassigned, and the updateable portion page is set as valid (step 198). If the key page associated with the respective column of that updateable portion page is assigned to a data structure (again, step 194), then the contents of that data structure is loaded from the persistent storage into the updateable portion page, and the updateable portion page is set as assigned to that data structure. The updateable portion page is set as valid (step 196).

The failover procedure inspects the synchronization page (step 202), and if it is invalid then the following is applied. If the synchronization page contains information then this information is restored using an application specific method. For example, if the synchronization page contains a version number, then this version number is set with a value that is higher than the locally stored version value. The synchronization page is set as valid (step 204). The method 170 then ends (step 206).

Figure 8:
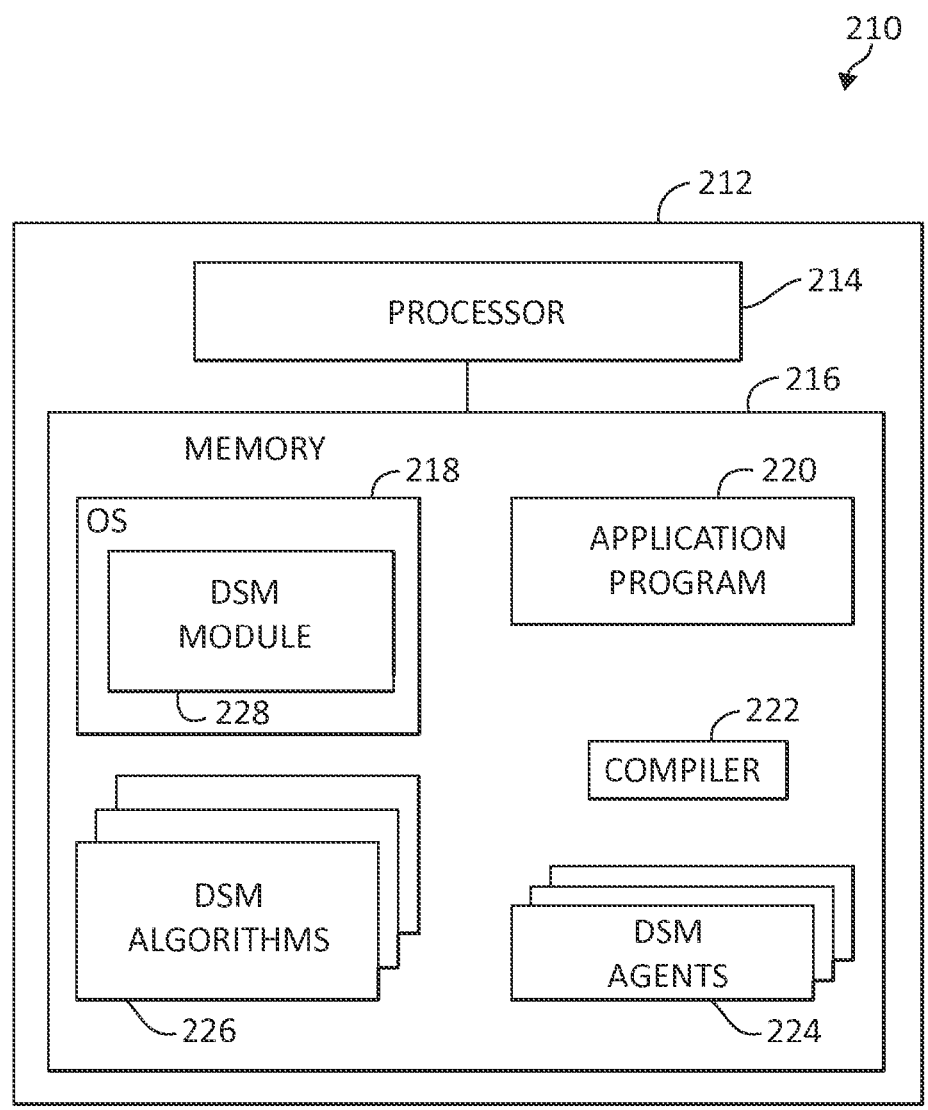
FIG. 8 illustrates exemplary hardware for implementing one or more aspects of the present invention.

Turning now to FIG. 8, an exemplary portion 212 of a DSM system 210 is illustrated. Portion 212 of DSM system 210 is operable in a computer environment as a portion thereof, in which mechanisms of the following illustrated embodiments may be implemented. It should be appreciated, however, that FIG. 8 is only exemplary and is not intended to state or imply any limitation as to the particular architectures in which the exemplary aspects of the various embodiments may be implemented. Many modifications to the architecture depicted in FIG. 8 may be made without departing from the scope and spirit of the following description and claimed subject matter.

Portion 212 includes a processor 214 and a memory 216, such as random access memory (RAM). The DSM system 210, and portion 212 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the DSM system 210 and/or portion 212.

In the illustrated embodiment, the portion 212 operates under control of an operating system (OS) 218 (e.g. z/OS, OS/2, LINUX, UNIX, WINDOWS, MAC OS) stored in the memory 216, and interfaces with the user to accept inputs and commands and to present results. In one embodiment of the present invention, the OS 218 facilitates DSM functionality according to the present invention. To this end, OS 218 includes a DSM module 228 which may be adapted for carrying out various processes and mechanisms in the exemplary methods described following.

Portion 212 may implement a compiler 222 that allows an application program 220 written in a programming language such as COBOL, PL/1, C, C++, JAVA, ADA, BASIC, VISUAL BASIC or any other programming language to be translated into code that is readable by the processor 214. After completion, the application program 220 accesses and manipulates data stored in the memory 216 of the system 210 using the relationships and logic that was generated using the compiler 222.

To further implement and execute mechanisms and processes according to the present invention, OS 218, in conjunction with memory 216, processor 214, application program 220, and other computer processing, networking, and storage components, may implement DSM agents 224 and DSM algorithms 226 employing various aspects of the previously described exemplary embodiments. As the skilled artisan will appreciate, the mechanisms of DSM algorithms 226 and DSM agents 224 as presently illustrated may be implemented in various forms and architectures. Accordingly, the illustration of DSM algorithms 226 and DSM agents 224 in the present figure is again intended to demonstrate logical relationships between possible computing components in the DSM system 210 and portion 212, and not to imply a specific physical structure or relationship.

In one embodiment, instructions implementing the operating system 218, the application program 220, and the compiler 222, as well as the DSM algorithms 226 and DSM agents 224 are tangibly embodied in a computer-readable medium, which may include one or more fixed or removable data storage devices, such as a zip drive, disk, hard drive, DVD/CD-ROM, digital tape, solid state drives (SSDs), etc. Further, the operating system 218 and the application program 220 may comprise instructions which, when read and executed by the system 210 and/or portion 212, cause the system 210 and/or portion 212 to perform the steps necessary to implement and/or use the present invention. Application program 220 and/or operating system 218 instructions may also be tangibly embodied in the memory 216. As such, the terms "article of manufacture," "program storage device" and "computer program product" as may be used herein are intended to encompass a computer program accessible and/or operable from any computer readable device or media.

Embodiments of the present invention may include one or more associated software application programs 220 that include, for example, functions for managing a distributed computer system comprising a network of computing devices, such as a storage area network (SAN). Accordingly, processor 214 may comprise one or more storage management processors (SMPs). The application program 220 may operate within a single computer and/or DSM 210 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for restoring distributed shared memory (DSM) data consistency within a recovery process from a failure of a node in a cluster of nodes by a processor device, comprising:

storing a set of data structures in a DSM component and in persistent storage; organizing the DSM component as a matrix of pages, wherein a data structure of the set of data structures occupies a column in the matrix of pages;

maintaining a recovery file in the persistent storage, wherein the recovery file consists of a plurality of entries and each one of the plurality of entries corresponds to a column in the matrix of pages by a location of each one of the plurality of entries;

incorporating into each one of the plurality of entries in the recovery file an indication that an associated column in the matrix of pages is assigned with the data structure of the set of data structures;

incorporating into each one of the plurality of entries in the recovery file identifying key properties of the data structure of the set of data structures and a specification of the location of the data structure in the persistent storage when the associated column in the matrix of pages is assigned; and defining each column in the matrix of pages to consist of a plurality of pages, wherein at least one page of the plurality of pages includes the identifying key properties of at least one of a plurality of data structures and additional pages of the plurality of pages include updatable properties of the at least one of the plurality of data structures.

2. The method of claim 1, further including performing one of:

updating the recovery file during an addition of a new data structure to the set of data structures by performing one of:

updating one of the plurality of entries in the recovery file, which corresponds by the location to the column in the matrix of pages of the recovery file where the new data structure has been inserted, with the identifying key properties of the new data structure and with the location of the new data structure in the persistent storage, and modifying those of the plurality of entries in the recovery file, which correspond by the location of the plurality of entries in the recovery file to the columns in the matrix of pages, wherein the assignments of the columns in the matrix of pages with existing data structures have been modified during the addition of the new data structure, with updated identifying key properties and storage locations reflecting the new assignments.

3. The method of claim 2, further including modifying the recovery file such that the updating is performed in memory and then written to the recovery file in the persistent storage.

4. The method of claim 1, further including using the recovery file during the recovery process by performing one of:

denoting pages of the plurality of pages in the matrix of pages, whose contents is invalid, as invalid DSM pages, for an invalid DSM page of the plurality of pages containing identifying key properties, reassigning one of the plurality of pages if one of:

one of the entries in the plurality of entries in the recovery file corresponding to the column in the matrix of pages containing one of the plurality of invalid DSM pages indicates that there is no assignment of the column to the data structure in the persistent storage, and the one of the entries in the plurality of entries indicates that there is the assignment but the data structure does not exist in the specified location in the persistent storage, then that DSM page is reset to be unassigned loading contents of the data structure from the persistent storage into the one of the plurality of pages and setting the one of the plurality of pages as assigned to the data structure if the one of the entries in the plurality of entries in the recovery file corresponding to the column in the matrix of pages indicates that there is the assignment of the column to the data structure in the persistent storage and there is an actual data structure in the specified location in the persistent storage, and setting the one of the plurality of pages as valid.

5. The method of claim 4, further including, for an additional invalid DSM page containing updateable properties, performing one of:

resetting the additional invalid DSM page to be unassigned if a DSM page containing the identifying key properties, which is located within a same column in the matrix of pages, is not assigned with the data structure, loading contents of the data structure from the persistent storage into the additional invalid DSM page, and setting the additional invalid DSM page as assigned to the data structure, if the DSM page containing the identifying key properties, which is located within the same column in the matrix of pages, is assigned with the data structure, and setting the additional invalid DSM page as valid.

6. The method of claim 4, further including determining a DSM page of the plurality of pages as invalid if the DSM page is invalid in a local DSM of a node performing a recovery operation and if the DSM page is determined to be invalid in a plurality of DSMs of all other operational cluster nodes in reply to a query sent by the node to each of the operational cluster nodes.

7. The method of claim 6, further including blocking access, except for the recovery operation, by a DSM mechanism to the plurality of pages determined to be invalid for a duration of the recovery operation.

8. A system for restoring distributed shared memory (DSM) data consistency within a recovery process from a failure of a node in a cluster of nodes in a computing environment, comprising:

the DSM;

a DSM component in the DSM having set of data structures;

a plurality of nodes in the cluster of nodes in the DSM;

a storage system associating with the cluster of nodes, wherein the storage system includes at least persistent storage; and at least one processor device, operable in the DSM, in communication with the plurality of nodes and the storage system, wherein the at least one processor device:

stores a set of the data structures in the DSM component and in the persistent storage;

organizes the DSM component as a matrix of pages, wherein a data structure of the set of data structures occupies a column in the matrix of pages;

maintains a recovery file in the persistent storage, wherein the recovery file consists of a plurality of entries and each one of the plurality of entries corresponds to a column in the matrix of pages by a location of each one of the plurality of entries;

incorporates into each one of the plurality of entries in the recovery file an indication that an associated column in the matrix of pages is assigned with the data structure of the set of data structures;

incorporates into each one of the plurality of entries in the recovery file identifying key properties of the data structure of the set of data structures and a specification of the location of the data structure in the persistent storage when the associated column in the matrix of pages is assigned; and defines each column in the matrix of pages to consist of a plurality of pages, wherein at least one page of the plurality of pages includes the identifying key properties of at least one of a plurality of data structures and additional pages of the plurality of pages include updatable properties of the at least one of the plurality of data structures.

9. The system of claim 8, wherein the at least one processor device performs one of:

updating the recovery file during an addition of a new data structure to the set of data structures by performing one of:

updating one of the plurality of entries in the recovery file, which corresponds by the location to the column in the matrix of pages of the recovery file where the new data structure has been inserted, with the identifying key properties of the new data structure and with the location of the new data structure in the persistent storage, and modifying those of the plurality of entries in the recovery file, which correspond by the location of the plurality of entries in the recovery file to the columns in the matrix of pages, wherein the assignments of the columns in the matrix of pages with existing data structures have been modified during the addition of the new data structure, with updated identifying key properties and storage locations reflecting the new assignments.

10. The system of claim 9, wherein the at least one processor device modifies the recovery file such that the updating is performed in memory and then written to the recovery file in the persistent storage.

11. The system of claim 8, wherein the at least one processor device uses the recovery file during the recovery process by performing one of:

denoting pages of the plurality of pages in the matrix of pages, whose contents is invalid, as invalid DSM pages, for an invalid DSM page of the plurality of pages containing identifying key properties, reassigning one of the plurality of pages if one of:

one of the entries in the plurality of entries in the recovery file corresponding to the column in the matrix of pages containing one of the plurality of invalid DSM pages indicates that there is no assignment of the column to the data structure in the persistent storage, and the one of the entries in the plurality of entries indicates that there is the assignment but the data structure does not exist in the specified location in the persistent storage, then that DSM page is reset to be unassigned, loading contents of the data structure from the persistent storage into the one of the plurality of pages and setting the one of the plurality of pages as assigned to the data structure if the one of the entries in the plurality of entries in the recovery file corresponding to the column in the matrix of pages indicates that there is the assignment of the column to the data structure in the persistent storage and there is an actual data structure in the specified location in the persistent storage, and setting the one of the plurality of pages as valid.

12. The system of claim 11, wherein the at least one processor device, for an additional invalid DSM page containing updateable properties, performs one of:
- resetting the additional invalid DSM page to be unassigned if a DSM page containing the identifying key properties, which is located within a same column in the matrix of pages, is not assigned with the data structure,
- loading contents of the data structure from the persistent storage into the additional invalid DSM page, and setting the additional invalid DSM page as assigned to the data structure, if the DSM page containing the identifying key properties, which is located within the same column in the matrix of pages, is assigned with the data structure, and
- setting the additional invalid DSM page as valid.

13. The system of claim 11, wherein the at least one processor device determines a DSM page of the plurality of pages as invalid if the DSM page is invalid in a local DSM of a node performing a recovery operation and if the DSM page is determined to be invalid in a plurality of DSMs of all other operational cluster nodes in reply to a query sent by the node to each of the operational cluster nodes.

14. The system of claim 13, further including a DSM mechanism controlled by the at least one processor device, wherein the DSM mechanism blocks access, except for the recovery operation, by the DSM component to the plurality of pages determined to be invalid for a duration of the recovery operation.

15. A computer program product for restoring distributed shared memory (DSM) data consistency within a recovery process from a failure of a node in a cluster of nodes by a processor device, the computer program product comprising a non-transitory computer-readable storage medium having computer-readable program code portions stored therein, the computer-readable program code portions comprising:
- a first executable portion that stores a set of data structures in a DSM component and in persistent storage;
- a second executable portion that organizes the DSM component as a matrix of pages, wherein a data structure of the set of data structures occupies a column in the matrix of pages;
- a third executable portion that maintains a recovery file in the persistent storage, wherein the recovery file consists of a plurality of entries and each one of the plurality of entries corresponds to a column in the matrix of pages by a location of each one of the plurality of entries;
- a fourth executable portion that performs each of:
  - incorporating into each entry in the recovery file an indication that an associated column in the matrix of pages is assigned with the data structure of the set of data structures;
  - incorporating into each entry in the recovery file identifying key properties of the data structure of the set of data structures and a specification of the location of the data structure in the persistent storage when the associated column in the matrix of pages is assigned; and
- a fifth executable portion that defines each column in the matrix of pages to consist of a plurality of pages, wherein at least one page of the plurality of pages includes the identifying key properties of at least one of a plurality of data structures and additional pages of the plurality of pages include updatable properties of the at least one of the plurality of data structures.

16. The computer program product of claim 15, further including a fifth executable portion that performs one of:
- updating the recovery file during an addition of a new data structure to the set of data structures by performing one of:
  - updating the entry in the recovery file, which corresponds by the location to the column in the matrix of pages of the recovery file where the new data structure has been inserted, with the identifying key properties of the new data structure and with the location of the new data structure in the persistent storage, and
  - modifying those of the plurality of entries in the recovery file, which correspond by the location of the plurality of entries in the recovery file to the columns in the matrix of pages, wherein the assignments of the columns in the matrix of pages with existing data structures have been modified during the addition of the new data structure, with updated identifying key properties and storage locations reflecting the new assignments.

17. The computer program product of claim 16, further including a sixth executable portion that modifies the recovery file such that the updating is performed in memory and then written to the recovery file in the persistent storage.

18. The computer program product of claim 15, further including a sixth executable portion that uses the recovery file during the recovery process by performing one of:
- denoting pages of the plurality of pages with invalid contents that are located in the matrix of pages as invalid DSM pages,
- for an invalid DSM page of the plurality of pages containing identifying key properties,
  - reassigning one of the plurality of pages if one of:
    - one of the entries in the plurality of entries in the recovery file corresponding to the column in the matrix of pages indicating that there is no assignment of the column to the data structure in the persistent storage, and
    - the one of the entries in the plurality of entries indicates that there is the assignment but there the data structure does not exist in the specified location in the persistent storage, then that DSM page is reset to be unassigned,
  - loading contents of the data structure from the persistent storage into the one of the plurality of pages and setting the one of the plurality of pages as assigned to the data structure if the one of the entries in the plurality of entries in the recovery file corresponding to the column in the matrix of pages indicates that there is the assignment of the column to the data structure in the persistent storage and there is an actual data structure in the specified location in the persistent storage, and
- setting the one of the plurality of pages as valid.

19. The computer program product of claim 18, further including a seventh executable portion that, for an additional invalid DSM page containing updateable properties, performs one of:
- resetting the additional invalid DSM page to be unassigned if a DSM page containing the identifying key properties, which is located within a same column in the matrix of pages, is not assigned with the data structure,
- loading contents of the data structure from the persistent storage into the additional invalid DSM page, and setting the additional invalid DSM page as assigned to the data structure, if the DSM page containing the identifying key properties, which is located within the same column in the matrix of pages, is assigned with the data structure, and
- setting the additional invalid DSM page as valid.

20. The computer program product of claim 18, further including a seventh executable portion that determines a DSM page of the plurality of pages as invalid if the DSM page is invalid in a local DSM of a node performing a recovery operation and if the DSM page is determined to be invalid in a plurality of DSMs of all other operational cluster nodes in reply to a query sent by the node to each of the operational cluster nodes.

21. The computer program product of claim 20, further including an eighth executable portion that blocks access by a DSM mechanism, except for the recovery operation, by the DSM component to the plurality of pages determined to be invalid for a duration of the recovery operation.

* * * * *